United States Patent
Murakami et al.

(10) Patent No.: US 6,607,830 B2
(45) Date of Patent: Aug. 19, 2003

(54) COMPOSITE MATERIAL FOR METAL GASKET

(75) Inventors: Yasunori Murakami, Wako (JP); Hitomi Tsuchiya, Wako (JP); Naomichi Mitsuyama, Saitama (JP)

(73) Assignees: Honda Giken Kogyo Kabushiki Kaisha, Tokyo (JP); Nippon Leakless Industry Co., Ltd., Tokyo (JP)

( * ) Notice: Subject to any disclaimer, the term of this patent is extended or adjusted under 35 U.S.C. 154(b) by 0 days.

(21) Appl. No.: 09/983,169

(22) Filed: Oct. 23, 2001

(65) Prior Publication Data
US 2002/0127411 A1 Sep. 12, 2002

(30) Foreign Application Priority Data
Oct. 24, 2000 (JP) .......................... 2000-323546

(51) Int. Cl.[7] .................... B32B 15/04; B32B 15/06; B32B 25/04; B32B 25/08; B32B 27/20
(52) U.S. Cl. .................. 428/422; 428/131; 428/137; 428/421; 428/457; 428/461; 428/462; 428/463; 277/591; 277/592; 277/627; 277/650; 277/651; 277/654; 277/939; 277/944; 277/945; 277/946
(58) Field of Search ................ 428/327, 457, 428/461, 962, 463, 421, 422, 131, 137; 277/591, 592, 627, 650, 651, 654, 939, 944, 945, 946

(56) References Cited

U.S. PATENT DOCUMENTS

| 4,096,207 A | * | 6/1978 | Saxon et al. ................. 525/199 |
| 4,133,927 A | * | 1/1979 | Tomoda et al. ............. 156/242 |
| 4,338,376 A | * | 7/1982 | Kritzler ....................... 427/386 |
| 4,596,839 A | * | 6/1986 | Peters .......................... 523/175 |
| 4,735,892 A | * | 4/1988 | Orpwood et al. ........... 430/323 |
| 4,962,136 A | * | 10/1990 | Peters ......................... 523/220 |
| 5,112,664 A | * | 5/1992 | Waterland, III ............. 277/650 |
| 5,123,151 A | * | 6/1992 | Uehara et al. ............... 219/216 |

FOREIGN PATENT DOCUMENTS

| EP | 0 142 716 A2 | * | 5/1985 |
| JP | 54-039472 A | * | 3/1979 |
| JP | 02-059362 | * | 4/1990 |
| JP | 11-005990 A | * | 1/1999 |

* cited by examiner

Primary Examiner—Vivian Chen
(74) Attorney, Agent, or Firm—Young & Thompson

(57) ABSTRACT

The composite material for a metal gasket includes a metal plate; a rubber layer fixed on the surface of the metal plate; and a solid lubricant layer fixed on the rubber layer. The solid lubricant layer contains polytetrafluoroethylene and a resin as main components, and has a friction coefficient equal to 0.15 or lower. Thus, the seal durability of the metal gasket is improved by effectively preventing fretting wear.

12 Claims, 4 Drawing Sheets

COMPOSITE MATERIAL FOR METAL GASKET

BACKGROUND OF THE INVENTION

1. Field of the Invention

The present invention relates to a composite material for a metal gasket, which is suitably used for an internal combustion engine, such as an automobile engine.

2. Description of the Related Art

In the case of the internal combustion engine such as an automobile engine, for example as shown in FIG. 3, joined surfaces 2a and 3a of flanges 2 and 3 fastened by a bolt 1 or the like are set in a fretting state, where horizontal shifting (horizontal direction fretting) like that indicated by an arrow A in FIG. 4(a) or fretting like that indicated by an arrow C caused by opening like that indicated by an arrow B in FIG. 4(b) repeatedly occurs because of vibration, thermal expansion or the like.

As a result, an inconvenient situation occurs. Specifically, as shown in FIG. 3, when a metal gasket 5 is used between the joined surfaces 2a and 3a of the flanges 2 and 3 for sealing fluids in a fluid passage 4, between the joined surfaces 2a and 3a of the flanges 2 and 3 and a bead portion 5a of the metal gasket 5, friction repeatedly occurs particularly at a projected portion D shown in each of FIGS. 4(a) and 4(b). As shown in FIG. 5, a rubber layer 5c fixed on a metal plate 5b of the metal gasket 5 was worn or peeled off early at the projected portion D, causing a great reduction in sealing performance.

Thus, in an effort to solve the problem of such fretting wear, the following measures have conventionally been tried:

(a) a frictional force generated by fretting is reduced by coating solid lubricant (graphite, molybdenum disulfide or the like) containing inorganic powder on the surface of the fixed rubber layer;

(b) a frictional force generated by fretting is reduced by coating liquid lubricant (wax, oil, fatty acid or the like) on the surface of the fixed rubber layer;

(c) wear resistance is enhanced by increasing the curing degree of the fixed rubber layer, or the addition amount of carbon black or a filler component in a rubber composition so as to increase the hardness of the fixed rubber layer; and (d) as disclosed in Japanese Utility Model Laid-Open H2 (1990)-59362, and Japanese Utility Model Laid-Open H3 (1991)-124075, a metal gasket is slid to either one of the two joined surfaces sandwiching the metal gasket by providing a difference in frictional resistance between the front and back sides of the metal gasket.

However, there have been problems inherent in the foregoing measures. Specifically, in the case of the measure (a), the effect of reducing a frictional force by the lubricant containing inorganic powder is low, and the effect of reducing a frictional force cannot be obtained before the adaptation (transfer) of the solid lubricant to the flange joined surfaces. Consequently, the fixed rubber layer is worn when high-load fretting occurs in an initial state. In the case of the measure (b), the liquid lubricant is deteriorated with time if a use environment temperature of the metal gasket is severe, losing the effect of reducing a frictional force. Besides, depending on fluids to be sealed, the liquid lubricant is eluted by the fluids and lost, similarly increasing a frictional force to wear the fixed rubber layer.

In the case of the measure (c), the increased hardness of the fixed rubber layer causes reductions in sealing performances in a low surface pressure region and in a rough surface, resulting in the loss of the original sealing function of the metal gasket. In the case of the measure (d), since the wear of the fixed rubber layer caused by fretting is absorbed only by one side of the gasket, the degree of reduction in sealing performance is reduced. However, the problem still remains to be solved because the wear of the rubber layer is not eliminated completely. In addition, if a portion (high-pressure sealing portion, a fuel sealing portion or the like) requiring high sealing performance is present in the surface of a side, in which fretting occurs, this measure cannot be selected.

SUMMARY OF THE INVENTION

It is an object of the present invention to provide a composite material for a metal gasket, which is capable of advantageously solving the foregoing problems. In accordance with a first aspect of the present invention, a composite material for a metal gasket is provided, including: a metal plate; a rubber layer fixed on a surface of the metal plate; and a solid lubricant layer fixed on the rubber layer. The solid lubricant layer contains polytetrafluoroethylene and a resin as main components, and has a friction coefficient equal to 0.15 or lower.

In the metal gasket using the composite material of the present invention, since the solid lubricant layer fixed on the rubber layer contains polytetrafluoroethylene (PTFE) having a low friction coefficient, a high heat resistance and a stable chemical property, and a resin such as a synthetic resin or the like, the resin serves as a curing agent to fix PTFE on the rubber layer, and the PTFE reduces the friction coefficient of the solid lubricant layer to a low value of 0.15 or lower, thereby greatly reducing a frictional force between the metal gasket and joined surfaces.

According to the composite material of a first aspect of the present invention, the occurrence of wear in the fixed rubber layer can be effectively prevented even when high-load fretting occurs in an initial state. In addition, the loss of a fictional force reducing effect caused by deterioration with time can be prevented even when the environmental temperature of using the metal gasket is severe, and the loss of the lubricant caused by elution into fluids to be sealed can be prevented. As a result, it is possible to obtain sealing performance always stable for a long time.

Further, according to the composite material of the first aspect of the present invention, since wear can be prevented without any particular increase in hardness of the fixed rubber layer, no reductions occur in the sealing performance of a low surface pressure region, and the sealing performance of a rough surface. As a result, the original sealing function of the metal gasket can be maintained. Moreover, since the wear of the fixed rubber layer caused by fretting can be prevented in both sides of the gasket, even when a portion (a high-pressure sealing portion, a fuel sealing portion or the like) requiring high sealing performance exists in the surface of a fretting occurrence side, it is possible to sufficiently meet the requirement.

In accordance with a second aspect of the invention, a composite material for a metal gasket is provided, including: a metal plate; a rubber layer fixed on a surface of the metal plate; and a solid lubricant layer fixed on the rubber layer. The solid lubricant layer contains polytetrafluoroethylene, a resin and carbon black as main components, and has a friction coefficient equal to 0.15 or lower.

According to the composite material of the second aspect of the present invention, an operation and effect similar to that of the composite material of the first aspect can be obtained, and the carbon black functions as a releasing agent. Thus, it is possible to prevent the occurrence of blocking (phenomenon of adhering of layers fixed on metal plates to each other) when the composite material is stored in a stacked manner.

In the composite material of the invention, preferably, carbon black of 1 to 10 wt % (i.e. not less than 1 wt % and not more than 10 wt %) is contained in the solid lubricant layer. If the content of carbon black is less than 1 wt %, a sufficient releasing operation is not provided. On the other hand, if the content of carbon black exceeds 10 wt %, the friction coefficient of the solid lubricant layer becomes excessively large.

DESCRIPTION OF THE PREFERRED EMBODIMENTS

Figure 1:
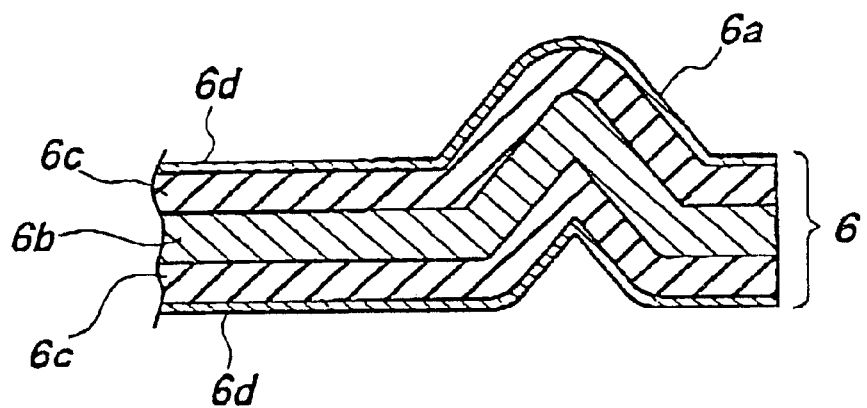
FIG. 1 is a partially expanded sectional view showing a composite material for a metal gasket according to an embodiment of the present invention.

Next, the preferred embodiments of the present invention will be described in detail with reference to the accompanying drawings. FIG. 1 is a partially expanded sectional view showing a metal gasket using a composite material therefor according to an embodiment of the invention. The composite material of the embodiment includes: a metal plate 6b; a synthetic rubber layer 6c as a rubber layer fixed onto each of both surfaces of front and back sides of the metal layer 6b; and a PTFE containing solid lubricant layer 6d having a friction coefficient of 0.15 or lower, fixed onto each of the surfaces of the synthetic rubber layers 6c. A metal gasket 6 illustrated in the drawing, using the composite material of the embodiment, has a mountain-shaped (so-called full bead type) bead portion 6a for sealing fluids.

Table 1 shows the composition of the solid lubricant layer 6d in a first example of the composite material according to the first embodiment.

TABLE 1

| | | (First Example) WT % | | | |
|---|---|---|---|---|---|
| Friction coefficient | PTFE | Carbon black | Graphite | Urethane resin | Silicon resin |
| 0.124 | 30 | 5 | 3 | 57 | 5 |

The metal gasket using the composite material of the first example having the solid lubricant layer 6d of the above composition was installed between joined surfaces of an engine cylinder head and an intake manifold flange, and a real machine durability test of applying a fretting load to the joined surfaces by repeating heating and cooling was carried out for 800 cycles. As a result, it was verified that no wear occurred in the synthetic rubber layer 6c of the bead portion 6a of the metal gasket 6, and high seal durability was present.

For the metal gasket 6 using the composite material of each of second to sixth examples having a solid lubricant layer 6d of a composition shown in each of Tables 2 to 6 described below, a test similar to that for the first example was carried out and, as a result, the presence of high seal durability was verified.

TABLE 2

| | | (Second Example) WT % | | | |
|---|---|---|---|---|---|
| Friction coefficient | PTFE | Carbon black | Mica | Silicon resin | Epoxy resin |
| 0.145 | 30 | 1 | 5 | 19 | 45 |

TABLE 3

| | | (Third Example) WT % | | | |
|---|---|---|---|---|---|
| Friction coefficient | PTFE | Carbon black | Silica | Molybdenum disulfide | Epoxy resin |
| 0.131 | 20 | 5 | 30 | 15 | 30 |

TABLE 4

| (Fourth Example) | | | | WT % |
|---|---|---|---|---|
| Friction coefficient | PTFE | Carbon black | Silicon resin | Phenol resin |
| 0.098 | 35 | 5 | 30 | 30 |

TABLE 5

| | | (Fifth Example) WT % | | | |
|---|---|---|---|---|---|
| Friction coefficient | PTFE | Carbon black | NBR | Silicon resin | Urethane resin |
| 0.128 | 40 | 2 | 5 | 18 | 35 |

TABLE 6

| | | (Sixth Example) WT % | | | |
|---|---|---|---|---|---|
| Friction coefficient | PTFE | Carbon black | Graphite | Molybdenum disulfide | Phenol resin |
| 0.145 | 20 | 1.5 | 10.5 | 15 | 53 |

Table 7 shows the composition of a lubricant layer in the composite material of a first comparative example, where instead of the solid lubricant layer 6d of the composite material of the foregoing embodiment, the other lubricant layer having an increased graphite content is provided on the surface of each of the synthetic rubber layers 6c in both sides of the metal plate 6b.

TABLE 7

(First Comparative Example) WT %

| Friction coefficient | PTFE | Carbon black | Graphite | Urethane resin | Silicon |
|---|---|---|---|---|---|
| 0.224 | 20 | 3 | 20 | 30 | 27 |

The metal gasket 6 using the composite material of the first comparative example having the lubricant layer of the above composition was installed between the joined surfaces of an engine cylinder head and an intake manifold flange as in the case of each of the foregoing examples, and a real machine durability test of applying a fretting load to the joined surfaces by repeating heating and cooling. As a result, wear occurred in the synthetic rubber layer 6c of the bead portion 6a of the metal gasket 6 at 300 cycles or less, and sealing performance was greatly reduced.

For the metal gasket 6 using the composite material of each of second to fifth comparative examples having a lubricant layer of a composition different from that of each of the examples, the composition being shown in each of Tables 8 to 11, a test similar to that of the first comparative example was carried out. As a result, it was verified that wear occurred in the synthetic rubber layer 6c of the bead portion 6a of the metal gasket 6 at 300 cycles or less.

TABLE 8

(Second Comparative Example) WT %

| Friction coefficient | Wax | Silicon resin | Graphite | PTFE |
|---|---|---|---|---|
| 0.257 | 30 | 30 | 30 | 10 |

TABLE 9

(Third Comparative Example) WT %

| Friction coefficient | Graphite | PTFE | Epoxy resin |
|---|---|---|---|
| 0.328 | 85 | 5 | 10 |

TABLE 10

(Fourth Comparative Example) WT %

| Friction coefficient | Wax | Silicon oil | PTFE |
|---|---|---|---|
| 0.317 | 80 | 15 | 5 |

TABLE 11

(Fifth Comparative Example) WT %

| Friction coefficient | PTFE | Carbon black | NBR |
|---|---|---|---|
| 0.315 | 70 | 5 | 25 |

Figure 2:
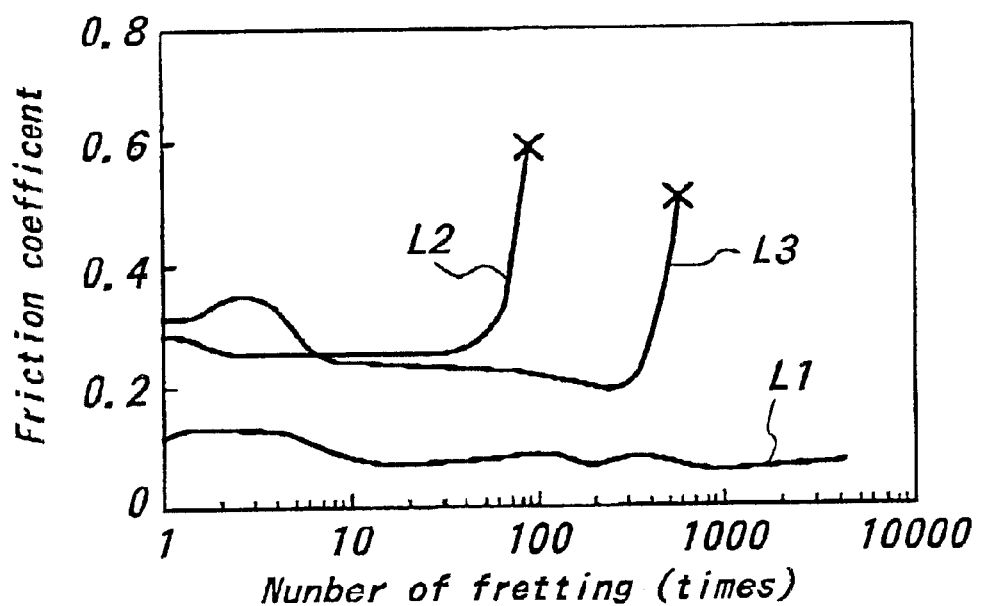
FIG. 2 is a characteristic diagram showing a result of a fretting test for a metal gasket using the composite material of the above embodiment, and a metal gasket using a composite material of a comparative example.
Figure 3:
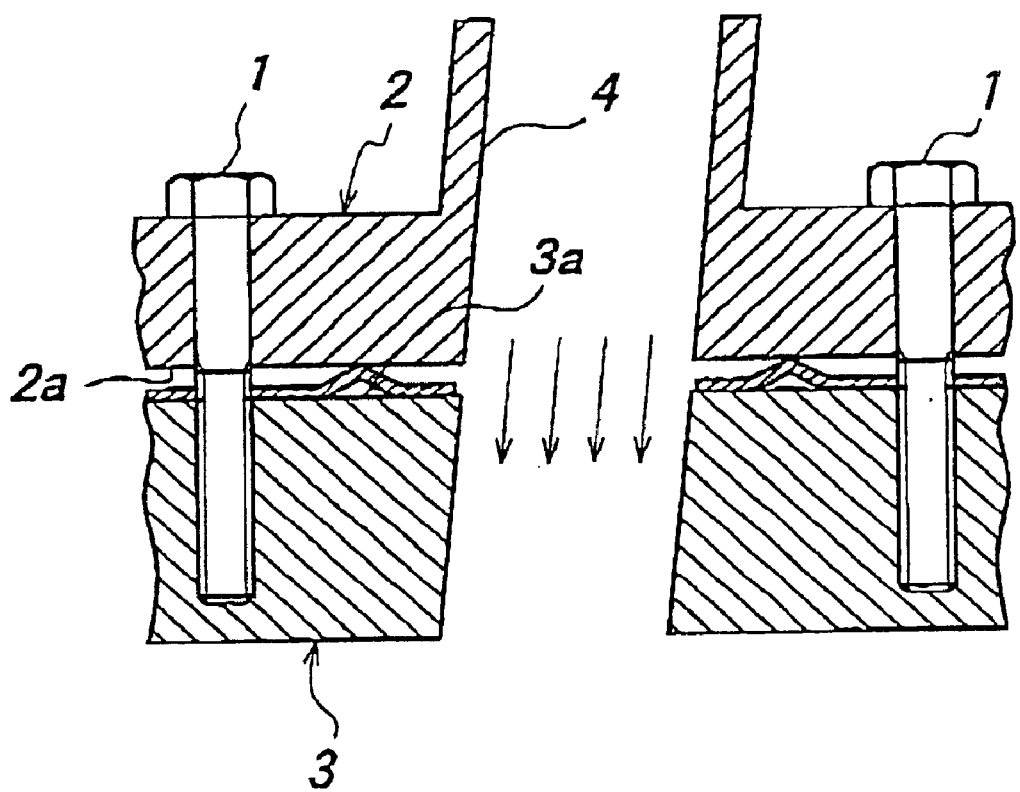
FIG. 3 is a sectional view illustrating a metal gasket in use.
Figure 4A:
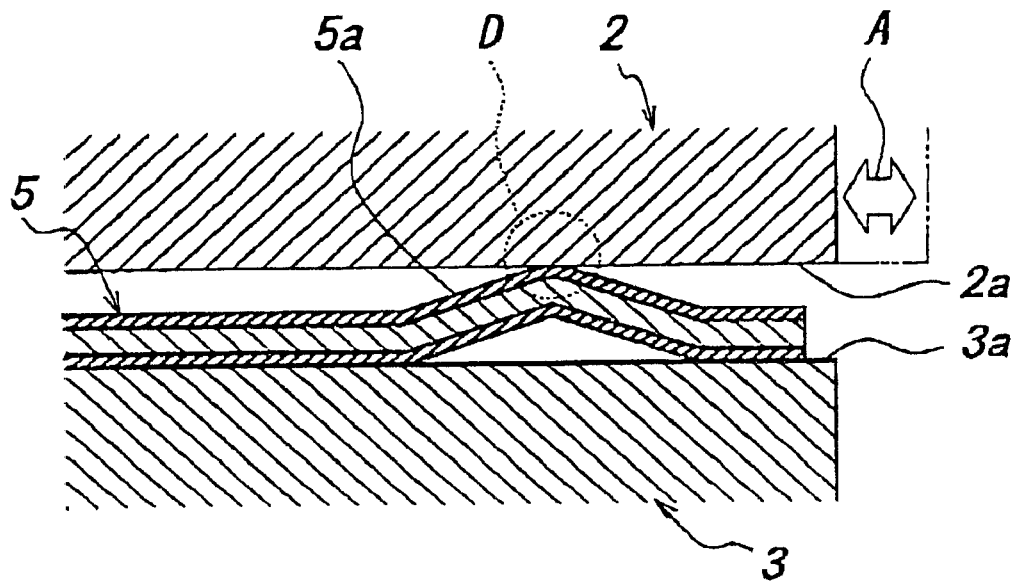
FIGS. 4(*a*) and 4(*b*) are views showing fretting in joined surfaces.
Figure 4B:
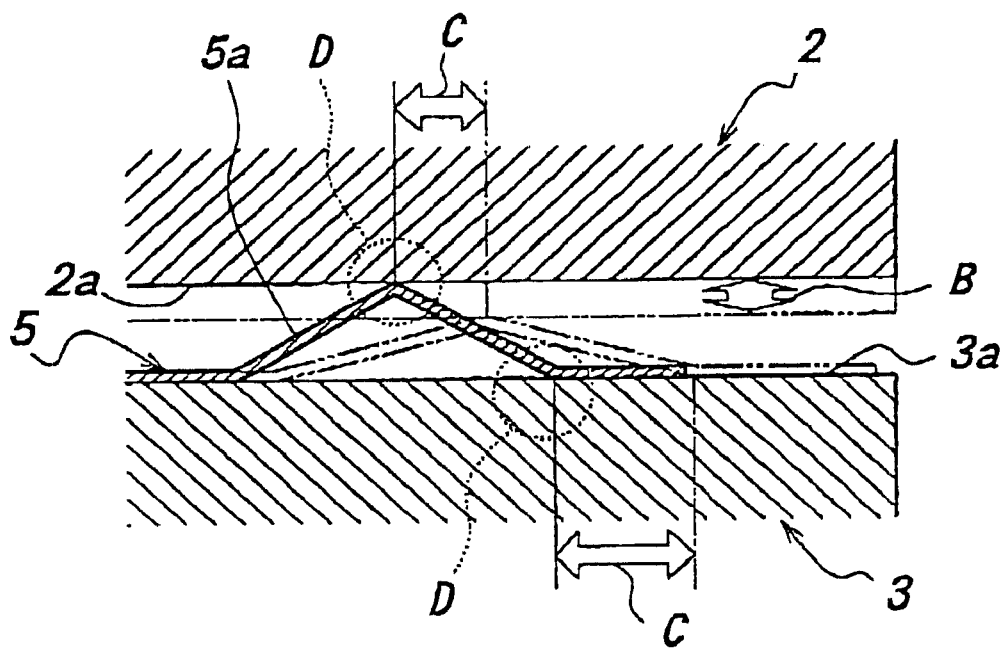
Figure 5:
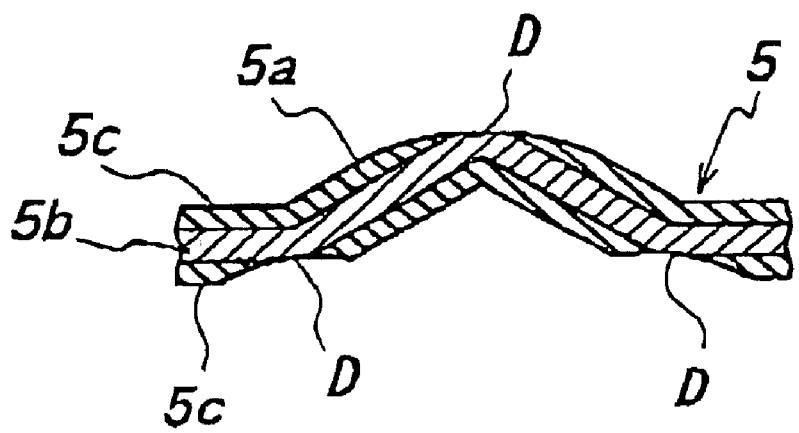
FIG. 5 is a view illustrating a worn state of a conventional metal gasket caused by fretting.

FIG. 2 is a graph showing the result of carrying out a fretting test for each of the metal gaskets using the composite materials of the embodiment and the comparative examples while measuring a friction coefficient, and verifying the durability of the metal gasket to fretting based on a change in a friction coefficient as a wear index for the rubber layer. The test was specifically carried out by using an FPR-2000 ball-on-disk type friction tester by Reska Co. Ltd., pressing a pin (diameter: 5±0.01 mm, length: 25±0.01 mm, tip spherical surface: S10, material: SUJ2, hardness HRC: 58, tip roughness Ra: 0.5) to a test piece of 50 mm square on the turntable of the tester at a pressing load of 49.1 N, and alternately rotating the turntable clockwise and counterclockwise at a friction length of 25 mm, and a turntable rotational speed of 50 mm/sec. An atmospheric temperature was 25±5° C. during the measurement.

In FIG. 2, the composite material of the first example among those of the foregoing embodiment is denoted by L1; the composite material of the fourth comparative example among the foregoing comparative examples, having the layer of a wax (paraffin) containing lubricant as a liquid lubricant in the surface, by L2: and the composite material of the third comparative example among the comparative examples, having the layer of a graphite containing lubricant as an inorganic powder containing solid lubricant, by L3.

In the fretting test, first, a comparison test was carried out for the composite materials of the first example and the third comparative example. As a result, in the case of the composite material of the third comparative example having the layer of the graphite containing lubricant, damage was given to the rubber layer of the metal gasket because of a high friction coefficient before initial adaptation occurred and, as indicated by the characteristic line L3 in FIG. 2, the rubber layer was worn by fretting of only about 500 times. On the other hand, in the case of the composite material of the first example, a stable behavior was exhibited by a low friction coefficient from the beginning and, as indicated by the characteristic line L1 in FIG. 2, the rubber layer was not worn at all even by fretting of 3000 times or more.

In the fretting test, secondly, a comparison test was carried out for the composite materials of the first example and the fourth comparative example under a fuel (gasoline) coexistent environment. As a result, in the case of the composite material of the fourth comparative example having the layer of a wax (paraffin) containing lubricant, the coated wax was eluted by fuel and, as indicated by a characteristic line L2 in FIG. 2, a frictional force was increased, and at the same time the rubber layer was worn by fretting of only about 100 times. On the other hand, in the case of the composite material of the first example, no lubricant elution or degeneration occurred even in fuel, and a stable low frictional force was maintained as in the case indicated by the characteristic line L1.

Therefore, according to the composite material of the embodiment, the occurrence of wear in the fixed rubber layer 6c can be prevented even when high-load fretting occurs in an initial state. Even when the environmental temperature of using the metal gasket is severe, the loss of the frictional force reducing effect caused by deterioration with time can be prevented, and the loss of the lubricant caused by elution into fluids to be sealed can be prevented. As a result, it is possible to obtain always stable sealing performance.

Moreover, according to the composite material of the embodiment, since wear can be prevented without any particular increase in hardness of the fixed rubber layer 6c, no reductions occur in the sealing performance in the low surface pressure region or in the rough surface. Thus, the original sealing function of the metal gasket can be maintained. In addition, since the wear of the fixed rubber layer 6c caused by fretting can be prevented in both sides of the gasket, even when there is a portion (a high-pressure sealing portion, a fuel sealing portion or the like) requiring high sealing performance in the surface of a side of fretting occurrence, it is possible to sufficiently meet the requirement.

Table 12 below shows the result of investigating the occurrence of blocking (phenomenon of adhering of the layers fixed to the surfaces of the metal plates to each other) by leaving the composite material in a stacked manner, regarding the composite material of the embodiment, where the addition amount of carbon black in the solid lubricant layer 6d is varied.

TABLE 12

| | WT % | | | | |
|---|---|---|---|---|---|
| Friction coefficient | PTFE | Carbon black | Urethane resin | Silicon resin | Occurrence of blocking |
| 0.115 | 10 | 0 | 50 | 40 | Blocking occurred |
| 0.117 | 9.9 | 1 | 49.5 | 39.6 | No blocking |
| 0.120 | 9.5 | 5 | 47.5 | 38 | No blocking |
| 0.134 | 9 | 10 | 45 | 36 | No blocking |
| 0.208 | 8.5 | 15 | 42.5 | 34 | No blocking |

As can be understood from the result, by adding carbon black of 1 to 10 wt % as an additive to the solid lubricant of the solid lubricant layer 6d in the composite material of the embodiment, it is possible to effectively preventing blocking by increasing the releasing effect while maintaining a low friction coefficient.

The embodiment has been described by way of illustrated examples, but the present invention should no be limited to the foregoing embodiments. For example, the composite material of the present invention may have PTFE containing solid lubricant fixed on the surface of the rubber layer fixed onto one side surface of the metal plate. Such a composite material can constitute a laminated metal gasket by arranging the solid lubricant layer outward and stacking it.

What is claimed is:

1. A metal gasket, comprising:
   a metal plate comprising a first surface and a second surface;
   a rubber layer fixed on at least one surface of said metal plate; and
   a solid lubricant layer fixed on said rubber layer,
   wherein said solid lubricant layer contains polytetrafluoroethylene and a resin as main components, and has a friction coefficient not in excess of 0.15.

2. The metal gasket according to claim 1, wherein the rubber layer is fixed on the first and second surfaces.

3. A metal gasket, comprising:
   a metal plate comprising a first surface and a second surface;
   a rubber layer fixed on at least one surface of said metal plate; and
   a solid lubricant layer fixed on said rubber layer,
   wherein said solid lubricant layer contains polytetrafluoroethylene, a resin, and carbon black as main components, and has a friction coefficient not in excess of 0.15.

4. The metal gasket according to claim 3, wherein 1 to 10 wt % of carbon black is contained in said solid lubricant layer.

5. The metal gasket according to claim 4, wherein the rubber layer is fixed on the first and second surfaces.

6. The metal gasket according to claim 3, wherein the rubber layer is fixed on the first and second surfaces.

7. A metal gasket for an internal combustion engine comprising:
   a metal plate comprising a first surface and a second surface;
   a rubber layer fixed on at least one surface of said metal plate; and
   a solid lubricant layer fixed on said rubber layer,
   wherein said solid lubricant layer contains polytetrafluoroethylene and a resin as main components, and has a friction coefficient not in excess of 0.15.

8. The metal gasket according to claim 7, wherein the rubber layer is fixed on the first and second surfaces.

9. The metal gasket according to claim 7, wherein said solid lubricant layer further contains carbon black.

10. The metal gasket according to claim 9, wherein 1 to 10 wt % of carbon black is contained in said solid lubricant layer.

11. The metal gasket according to claim 10, wherein the rubber layer is fixed on the first and second surfaces.

12. The metal gasket according to claim 9, wherein the rubber layer is fixed on the first and second surfaces.

* * * * *